(12) United States Patent
Kazadi

(10) Patent No.: US 7,501,922 B2
(45) Date of Patent: Mar. 10, 2009

(54) PERMANENT MAGNETIC MALE AND FEMALE LEVITATION SUPPORTS

(76) Inventor: Sanza T. Kazadi, 28 North Oak Ave., Pasadena, CA (US) 91107

( * ) Notice: Subject to any disclaimer, the term of this patent is extended or adjusted under 35 U.S.C. 154(b) by 153 days.

(21) Appl. No.: 11/680,774

(22) Filed: Mar. 1, 2007

(65) Prior Publication Data

US 2007/0205854 A1 Sep. 6, 2007

Related U.S. Application Data

(60) Provisional application No. 60/767,062, filed on Mar. 1, 2006.

(51) Int. Cl.
*H01F 7/02* (2006.01)

(52) U.S. Cl. ................ 335/306; 335/284; 335/285; 335/288; 335/296; 335/298; 335/302

(58) Field of Classification Search .......... 335/209–306
See application file for complete search history.

(56) References Cited

U.S. PATENT DOCUMENTS

| | | | |
|---|---|---|---|
| 3,977,739 A | | 8/1976 | Moskowitz et al. |
| 4,040,681 A | * | 8/1977 | van der Heide ............ 310/90.5 |
| 4,382,245 A | * | 5/1983 | Harrigan .................... 335/306 |
| 5,099,216 A | * | 3/1992 | Pelrine ....................... 335/220 |
| 5,182,533 A | * | 1/1993 | Ritts ........................... 335/306 |
| 5,404,062 A | * | 4/1995 | Hones et al. ............... 310/90.5 |
| 5,506,459 A | * | 4/1996 | Ritts ........................... 310/90.5 |
| 5,584,367 A | | 12/1996 | Berdut |
| 5,589,721 A | * | 12/1996 | Han et al. .................. 310/90.5 |
| D397,376 S | * | 8/1998 | Hwang ...................... D21/460 |
| 5,825,105 A | | 10/1998 | Barber et al. |
| 5,895,018 A | | 4/1999 | Rielo |
| 6,318,899 B1 | | 11/2001 | Boyd |
| 6,402,118 B1 | | 6/2002 | Nijsse et al. |
| 6,413,138 B1 | * | 7/2002 | Dokoupil .................... 446/129 |
| 6,448,679 B1 | | 9/2002 | Imlach |
| 6,554,480 B2 | | 4/2003 | Ishiguro et al. |
| 6,781,270 B2 | * | 8/2004 | Long .......................... 310/90.5 |
| 6,838,967 B2 | | 1/2005 | Martin |
| 6,879,127 B2 | | 4/2005 | Gery |
| 6,920,870 B2 | | 7/2005 | Minica et al. |
| 6,971,507 B2 | | 12/2005 | Forman |
| 2003/0176144 A1 | * | 9/2003 | Fisher et al. ................ 446/133 |
| 2005/0126554 A1 | * | 6/2005 | Minica et al. ............... 124/44.5 |
| 2006/0044094 A1 | * | 3/2006 | Davis et al. ................. 335/220 |

* cited by examiner

*Primary Examiner*—Elvin G Enad
*Assistant Examiner*—Mohamad A Musleh
(74) *Attorney, Agent, or Firm*—Kelly Lowry & Kelley LLP

(57) ABSTRACT

A permanent magnetic male and female levitation support has a first part with a cavity and a plurality of retainment mechanisms incorporated therein, and a plurality of first permanent magnets evenly distributed around the perimeter of the cavity and held in place by the retainment mechanisms, wherein the first permanent magnets produce a first rotationally invariant magnetic field around a first axis. A second part is rigidly connected to a base and produces a second rotationally invariant magnetic field around a second axis. When the first axis is aligned with the second axis, the first magnetic field and the second magnetic field simultaneously produce a repulsive force and a restorative force to levitate the first part relative to the second part.

10 Claims, 4 Drawing Sheets

PERMANENT MAGNETIC MALE AND FEMALE LEVITATION SUPPORTS

BACKGROUND OF THE INVENTION

This invention relates to suspension of mechanical systems, both moving and stationary. More particularly, the invention relates to permanent magnetic male and female levitation supports.

One of the most important mechanical inventions in use today is the ball bearing. Ball bearings are used in thousands of devices and assist in the rolling, rotating, or sliding of surfaces and objects which are in contact with one another. These motions are possible because the surfaces and the objects can move relative to one another along the rolling surfaces. This, coupled with lubricants and mechanisms for holding the ball bearing in place, provides the ball bearings the freedom of motion needed for proper function while containing the required stability.

Three main themes exist in the prior art concerning ball bearings. The first concerns the reduction of excessive friction. Friction can lead to fretting of the ball bearings. A number of lubrication methods and new materials have been used to reduce friction. For instance, Gary Boyd invented a ball bearing that does not require lubricant as a result of the composite ceramic material. Boyd obtained U.S. Pat. No. 6,318,899, herein incorporated by reference, which discloses the improved physical qualities of the ceramic ball bearing. But, the ball bearing still requires a raceway and still has friction, both of which are largely mitigated using the present invention.

A second theme in the prior art concerning ball bearings is lubricant. There are two specific problems regarding lubricants. One problem concerns the method of lubricating the ball bearings and preventing subsequent leakage. The second lubricant problem is replenishing lubricant that is expended, before the ball bearings breakdown. One particularly interesting method of preserving lubricants in and around the ball bearings dates back to 1976. U.S. Pat. No. 3,977,739, herein incorporated by reference, incorporates a ferrolubricant that, when coupled with magnetic bearings or raceway assembly parts, concentrates lubricant and prevents leakage. Despite improved lubrication techniques, removal altogether of the physical contact point between ball bearings provides a better solution than lubricated parts.

A third and final theme in the prior art relating to ball bearings concerns the design of the raceway itself. One such raceway design is disclosed by Hiroshi Ishiguro et al. in U.S. Pat. No. 6,554,480, herein incorporated by reference. Raceways are designed to reduce the likelihood that ball bearings collide. The force among the ball bearings is equally distributed within the raceway to minimize potential collisions. But, none of these raceway improvements removes the rolling friction inherent in the design of ball bearings.

Magnetic levitation is a relatively new phenomenon and has roots in electromagnetic theory. In the earliest days of electromagnetic theory, it was thought that it was impossible to form a stable configuration of levitation magnets using forces only. In recent years, several improvements to magnetic levitation have made it possible to develop levitated or partially levitated devices using forces only.

The main design limitation of purely magnetically levitated devices is the functional power requirement. All applications, from magnetically levitated globes to magnetically levitated trains, require the use of some power to hold objects in place.

A recent improvement in magnetics involves the use of permanent magnets to stabilize devices that levitate or utilize magnetic attraction or repulsion for stability. For example, U.S. Pat. No. 5,584,367 to Elberto Berdut, herein incorporated by reference, describes the design of an automotive system that stabilizes an axle using a system of magnets. These magnets utilize both attraction and repulsion forces to provide stability within the system by maintaining the axle shaft in equilibrium. The system provides support and stabilization in one direction while depending on the stability of an independent support structure in the other direction. But, this device requires lubrication and mechanisms that allow sliding motion of different parts. The device is subject to part failure and wear associated with this motion. This problem is common among these devices.

Another example of a magnetic field used for stabilization is in U.S. Pat. No. 6,920,870, herein incorporated by reference, which discloses stabilization of an arrow shot by an archer. One of the magnetic fields in U.S. Pat. No. 6,920,870 is rotationally invariant, while the opposing magnetic field is not rotationally invariant. In fact, the opposing magnetic field is not arranged so as to produce an opposing force. The magnetic field is capable of holding the arrow up but does not provide stable mechanical support.

In addition to magnetic levitation, fluid-based bearing devices are also used to reduce friction between objects in close proximity. Fluids include all types of gases and liquids. But, the fluids require power to function. Regardless of the power requirement, fluid-based bearing devices have enabled the development of many devices that utilize fluids that flow from one object to another. Examples might include rolling balls or low friction tables.

The main limitations of the above-described devices is the energy required to pump the fluid and the additional structures that support the other technological devices (e.g., containment devices for fluid, filtration of fluids flowing, etc.).

Accordingly, there is a need for a non-contact permanent magnetic male and female levitation support. Such a levitation support should eliminate ball bearings to reduce machine complexity, failure points, and provide a low-friction alternative design. Further, there is a need for a levitation support that increases system efficiency while reducing power and thermal losses due to friction and physical contact of moving parts. Moreover, there is a need for a levitation support that eliminates any power requirement, despite power availability, and enables the use of magnetic levitation in areas where power is not available. The present invention fulfills these needs and provides other related advantages.

SUMMARY OF THE INVENTION

The permanent magnetic levitation support of the present invention includes a female part that has a cavity with a plurality of retainment mechanisms incorporated therein, wherein the retainment mechanisms may include a plurality of grooves. A plurality of permanent magnets reside at least partially within the grooves in the cavity. The magnetic poles of the permanent magnets are co-aligned to produce a first rotationally invariant magnetic field around an axis that is concentric to the female part. A male part, also having a rotationally invariant field around an axis concentric to the male part, is disposed within the interior of the female part within the cavity. Repulsive forces and restorative forces generated by the magnetic field of the female part and the magnetic field of the male part maintain the male part in a levitated state relative to the female part.

In this embodiment, the female part and the male part are aligned along a common concentric axis and are not in contact. The magnetic forces maintain the female part and the male part in a specific relative orientation to one another. Absent physical contact, neither the female part nor the male part produce sliding, rubbing, tapping, or any other contact related affect. Additionally, the present invention does not experience a loss of energy due to friction, degradation of materials due to rubbing or tapping, fretting, chipping, or other physical decay of any of the parts, and aging due to thermal breakdown. The levitation support also eliminates any need for tracks, rollers, bearings, or motion guards. Contact elimination between the female part and the male part works particularly well with devices that require precise measurements or movements that are otherwise affected by high frequency vibrations.

The repulsive forces and the restorative forces generated by the magnetic field of the female part and the magnetic field of the male part also eliminate any power requirement to energize levitation. Additional technologies that traditionally lubricate bearings, pump fluid, or perform other aspects of levitation or stabilization, including power sources, are not needed. Elimination of these various movable parts permits the levitation support of the present invention to support large loads while reducing corresponding friction. The female part is free to rotate about a contact point concentric to the female part and opposite the male part. Friction between a contact point and the female part decreases as the load exerted on the female part and the male part increases. Thus, friction relative to the overall force is exceedingly small. This affect is enabled by the non-contact relationship between the female part and the male part.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in FIGS. 1-10 for purposes of illustration, the present invention directed to permanent magnetic male and female levitation supports. The present invention utilizes several concepts from electromagnetism, geometry, and calculus. The applicable concepts are broadly explained herein.

Vector algebra is well known and commonly applied in the engineering fields. Individual vectors represent "directed magnitudes" which are defined in terms of coordinate magnitudes. That is, every vector is represented as an ordered triplet $(x_1, y_1, z_1)$ where $x_1, y_1$, and $z_1$ represent magnitudes in the x, y, and z directions, respectively. The magnitude of the vector is $\sqrt{(x_1^2+y_1^2+z_1^2)}$. Two or more vectors may be added together by adding each individual component. For example, the sum of vector A, having the ordered triplet $(x_1, y_1, z_1)$, and vector B, having the ordered triplet $(x_2, y_2, z_2)$ equals $(x_1+x_2)\mathbf{i}+(y_1+y_2)\mathbf{j}+(z_1+z_2)\mathbf{k}$, where $\mathbf{i}$, $\mathbf{j}$, and $\mathbf{k}$ are the basic vectors with length 1, that point in the positive x, y, and z directions, respectively. The resulting vector is known as the "sum of the vector" or "vector sum". When the vectors represent forces, the "net force" is a force that results from the vector sum of all the other forces.

The concept of "rotational symmetry" is defined by Wikipedia, an online encyclopedia increasingly cited in scholarly endeavors, as symmetry with respect to some or all rotations in m-dimensional Euclidean space. In the context of the present invention, the rotational symmetry is considered invariant (that which the conformation does not change) under a rotation, or under a series of repeated rotations, of a specific rotational multiplier of π. That is, the system of objects and resultant fields should remain unchanged under a rotation of magnitude of the rotational multiple of π. This includes, in particular, π/n, where n is any integer. Lastly, a magnetic node is a region of weaker magnetic field strength or reversed polarity with respect to the immediately surrounding regions.

A cone is a three dimensional solid object generated by rotating a right triangle about one of its legs. The cone has rotational symmetry about this leg. This line of rotational symmetry is known as the "cone's axis". When viewed in two dimensions along a plane that intersects the cone's axis, the cone appears as an isosceles triangle having a base and two equal length sides. A line that is perpendicular to the cone's axis will intersect the two equal length sides of the isosceles triangle. The angle created between the intersection of the perpendicular line and two equal length sides of the isosceles triangle is $2\theta_c$. Hereafter $\theta_c$ is the "defining angle" of the cone or other similarly shaped object such as a frusto-conical cone.

Figure 1:
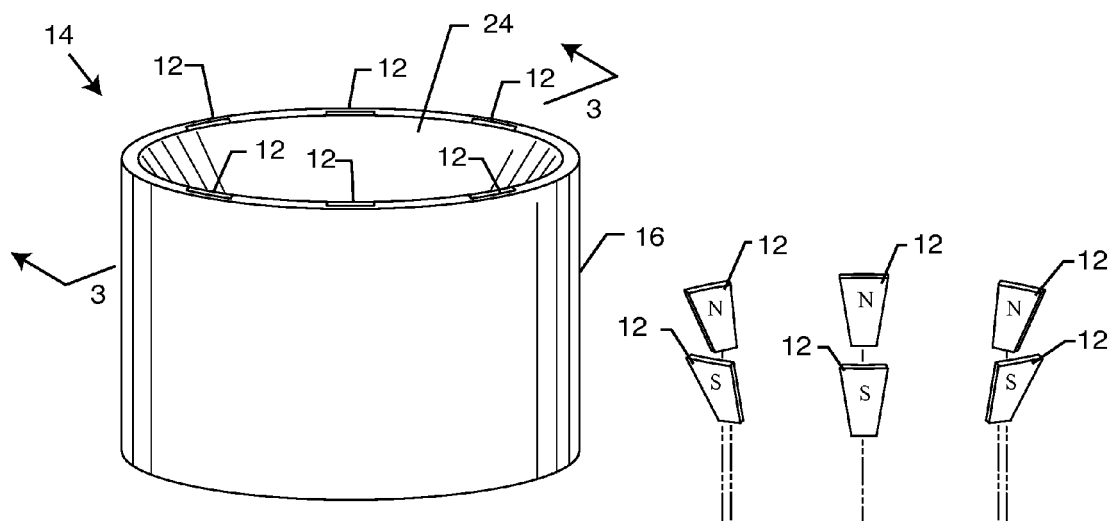
FIG. 1 illustrates a female part having a series of permanent magnets located within a frusto-conical cavity.
Figure 2:
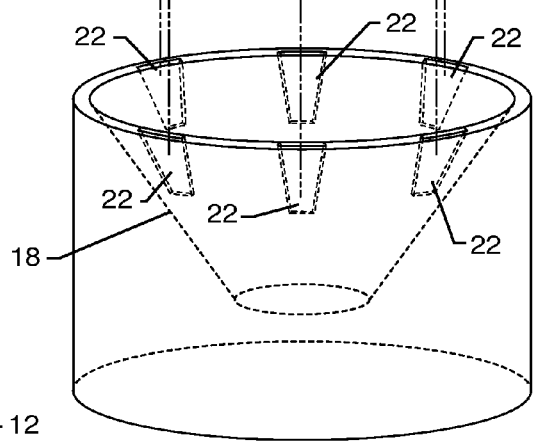
FIG. 2 is an exploded view of FIG. 1.
Figure 3:
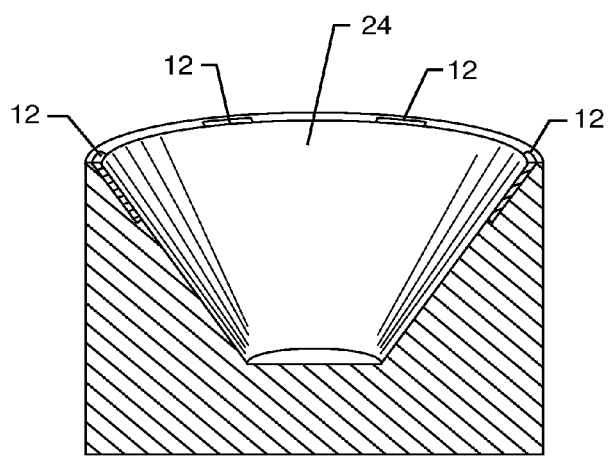
FIG. 3 is a cross-sectional view taken generally along the line 3-3; of FIG. 1.

In accordance with one embodiment of the present invention, a permanent magnetic male and female levitation support is referenced generally by the reference numeral 10. As shown in FIG. 1, a plurality of permanent magnets 12 are used to create a rotationally invariant magnetic field. This magnetic field has a rotationally invariant magnetic node located at the center of a female part 14 as surrounded by a stronger magnetic field. In one embodiment, a body 16 of the female part 14 has a conical cavity 18 (FIG. 2) hollowed out from an otherwise solid piece of plastic, metal, wood, or other material known in the art. As shown in FIG. 2, the plurality of magnets 12 are evenly distributed around the exterior of the body 16 within the conical cavity 18. The permanent magnets 12 comprise either ceramic, ferrous, or other permanent or temporary unpowered magnetic material, arranged to develop stable magnetic suspension of magnets. The magnets are arranged to exert repulsion forces on the opposed female part 14 and a male part 20. The repulsion forces cause the female part 14 and the male part 20 to remain in a relative position with respect to one another. A restorative force maintains the original orientation of the opposed female part 14 and male part 20 in the event that one part moves relative to the other.

In one embodiment, each of the permanent magnets 12 are placed in a series of grooves 22 formed in a wall 24 of the conical cavity 18. The grooves 22 are substantially the size of the permanent magnets 12. The permanent magnets 12 are placed partially or completely in the grooves 22. All of the permanent magnets 12 in the conical cavity 18 are arranged so that the magnetic poles (where N signifies the North Pole and S signifies the South Pole) are substantially perpendicular to the walls 24 of the conical cavity 18 (best shown in FIG. 3). All of the permanent magnets 12 are arranged with like poles oriented identically. In a sample embodiment shown in FIG. 2, all the North Poles are oriented inwardly within the conical cavity 18 of the female part 14. Accordingly, all the South Poles are oriented outwardly. It is also conceived in the present invention that the poles could be reversed such that the South Poles are oriented inwardly and the North Poles are oriented outwardly. The permanent magnets 12 are secured within the conical cavities 18 by friction between the permanent magnet 12 and the wall 24 or by any other means using non-magnetic media. Non-magnetic media includes, but is not restricted to, glue or mechanical restriction. Retainment of the permanent magnets 12 should not be limited to the grooves 22. The grooves 22 merely exemplify a preferred embodiment. Other retainment mechanisms known in the art are also suitable. The important aspect is that the permanent magnets 12 are retained in a position to create a rotationally invariant field within the conical cavity 18.

Figure 4:
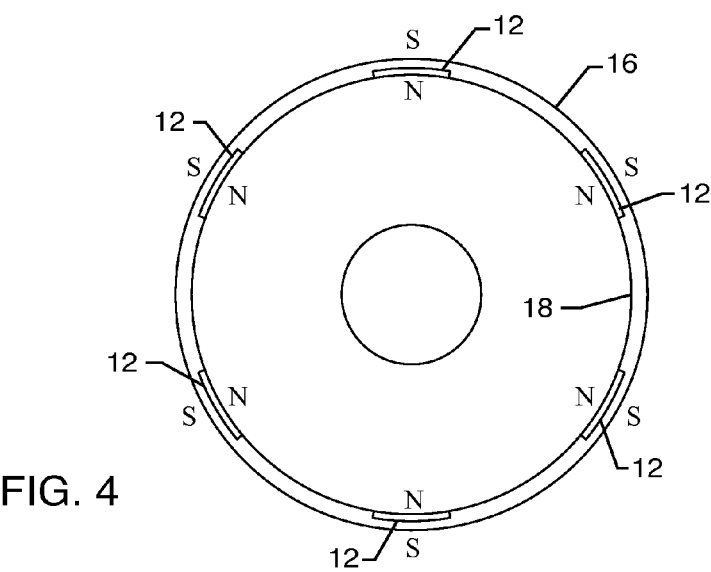
FIG. 4 is a top plan view of the female part of FIG. 1.
Figure 5:
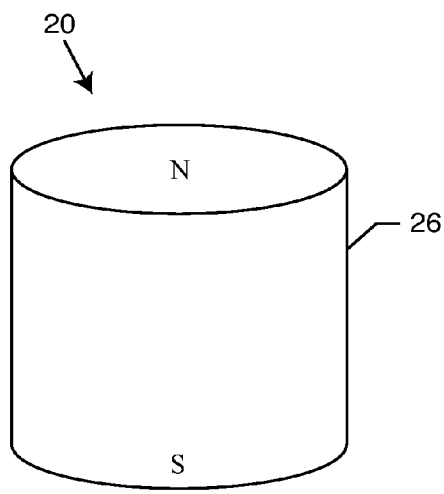
FIG. 5 is a perspective view of a male part embodying the invention.
Figure 6:
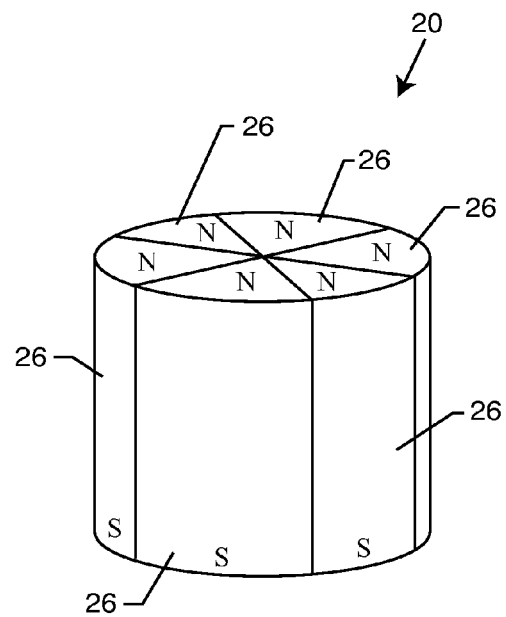
FIG. 6 illustrates the male part of FIG. 5, having a plurality of permanent magnets formed therein.

FIGS. 5 and 6 illustrate the male part 20 consisting of either a single permanent magnet 26 (FIG. 5) or a plurality of permanent magnets 26 (FIG. 6), as formed from either ceramic, ferrous, or other permanent magnetic medium. The male part 20 is also rotationally invariant and has no pole at a node located at the center of the cylinder. The magnetic field of the male part 20 is designed so that the majority of the high intensity magnetic field fits completely within the node of the female part 14. Moreover, as the female part 14 and the male part 20 are moved toward one another, the high intensity portions of the two magnetic fields overlap. FIG. 4 further illustrates the orientation of the magnetic poles of the present invention. The permanent magnets 12 are evenly spaced around the perimeter of the body 16 as aligned with the conical cavity 18. In the embodiment in FIG. 4, all of the North Poles of the permanent magnets 12 are positioned inwardly with respect to the conical cavity 18 of the female part 14. As previously disclosed, the orientation of the poles could be reversed such that the South Poles are oriented inwardly and the North Poles are oriented outwardly.

Figure 7:
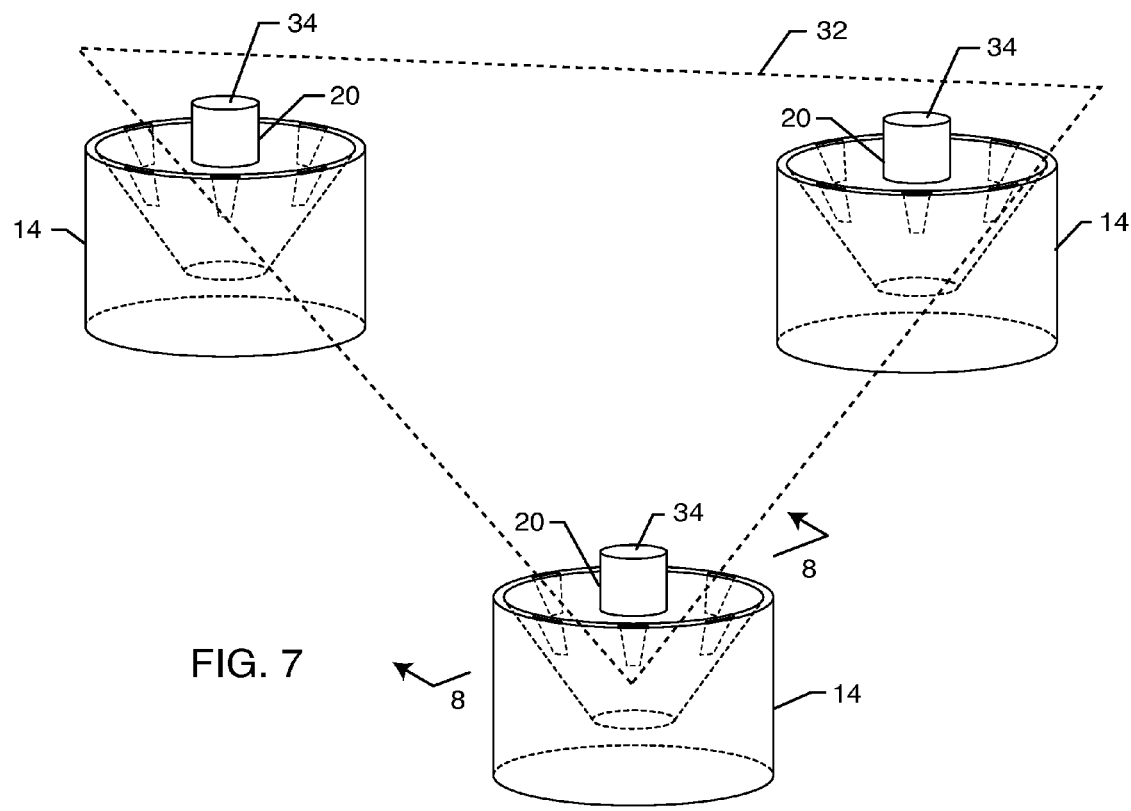
FIG. 7 illustrates three levitation supports in accordance with the present invention, wherein the female parts are suspended relative to the corresponding male parts which are themselves connected to a base.
Figure 8:
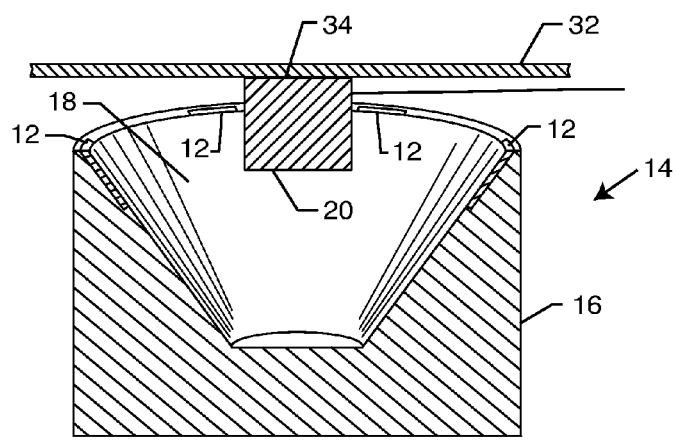
FIG. 8 is a cross-sectional view of one of the permanent magnetic male and female levitation supports taken along the line 8-8 in FIG. 7.

As shown in FIGS. 7-8, the male part 20 is rigidly attached to a base 32 along a surface 34. The base 32 is shown in phantom in FIG. 7 to better illustrate the relation between the female part 14 and male part 20. The male part 20 is disposed within the conical cavity 18 of the female part 14 in such a manner that the opposing magnetic fields of the female part 14 and the male part 20 face one another. A space is maintained between the female part 14 and the male part 20 so that transverse perturbations of the position of the female part 14 against the male part 20 causes a return force to be exerted. When the angle defining the rotational invariance is: $\pi/2$, the symmetry created is reflective. In this embodiment, the male part 20 is pushed toward the axis of symmetry, or plane of symmetry, and away from the apex of the female part 14.

The magnetic fields generated by both the female part 14 and the male part 20 enable suspension of the female part 14 relative to the male part 20 as affixed to the base 32 (FIGS. 7-8). The magnetic fields generated by the female part 14 and the male part 20 effectively retain the relative configuration of the female part 14 and the male part 20 as shown in FIG. 8. Any movement of the female part 14 relative to the male part 20 as affixed to the base 32 is immediately corrected by the repulsion and attractive forces between the female part 14 and the male part 20. As shown from the side view in FIG. 8, the male part 20 resides partially within the interior of the conical cavity 18 of the body 16 of the female part 14. The male part 20 is positioned within the rotationally invariant magnet node located at the center of the conical cavity 18. In the configuration of FIG. 8, the female part 14 and male part 20 remain substantially aligned along a rotationally invariant axis running vertically and concentrically through the female part 14 and the male part 20. It is the repulsive forces and the restorative forces exerted by the magnetic fields of the female part 14 and the male part 20 that maintain alignment of the concentric axis of the female part 14 with the concentric axis of the male part 20.

The size of the magnetic field of the female part 14 and the size of the magnetic field of the male part 20 must allow the male part 20 to fit into the magnetic field of the female part 14. In the same instance, the magnetic field of the male part 20 must oppose the magnetic field of the female part 14 if the male part 20 moves vertically into the conical cavity 18 of the female part 14. One way of obtaining this configuration is to restrict the size of the magnetic field of the male part 20 to fit between the magnetic field of the female part 14 as generated by the plurality of permanent magnets 12 retained around the perimeter of the conical cavity 18.

In the embodiments in FIGS. 7-8, the permanent magnet male and female levitation support 10 suspends the female part 14 from the male part 20. Suspension reduces and eliminates contact between the female part 14 and the male part 20. Suspension of the female part 14 has a variety of uses, including stabilization. In one embodiment, the female part 14 may be connected to a tire assembly and the male part 20 connected to an axle assembly. While driving, perturbations of the tire assembly causes displacement of the female part 14 relative to the male part 20. But, the magnetic forces in the female part 14 and the male part 20 realign the concentric axis of the male part 20 with the concentric axis of the female part 14 to stabilize the tire assembly relative to the axle as part of the suspension system for a vehicle. Additionally, any vertical movement of the male part 20 within the conical cavity 18 of the female part 14 is also restored by the magnetic forces of the male part 20 and the female part 14.

Figure 9:
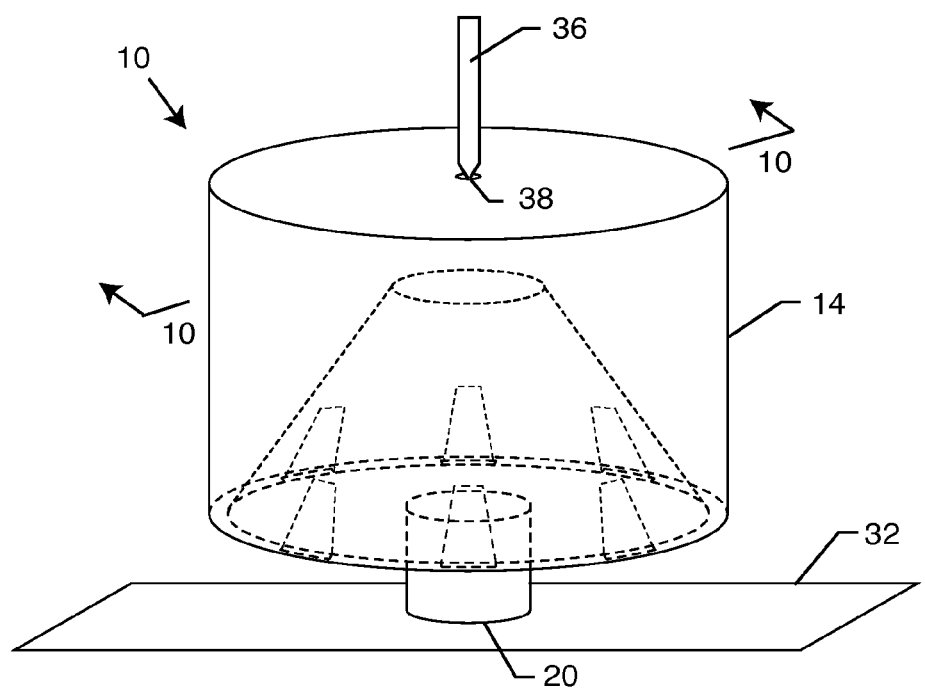
FIG. 9 is a perspective view of a permanent magnetic male and female levitation support capable of rotating about a pivot point.
Figure 10:
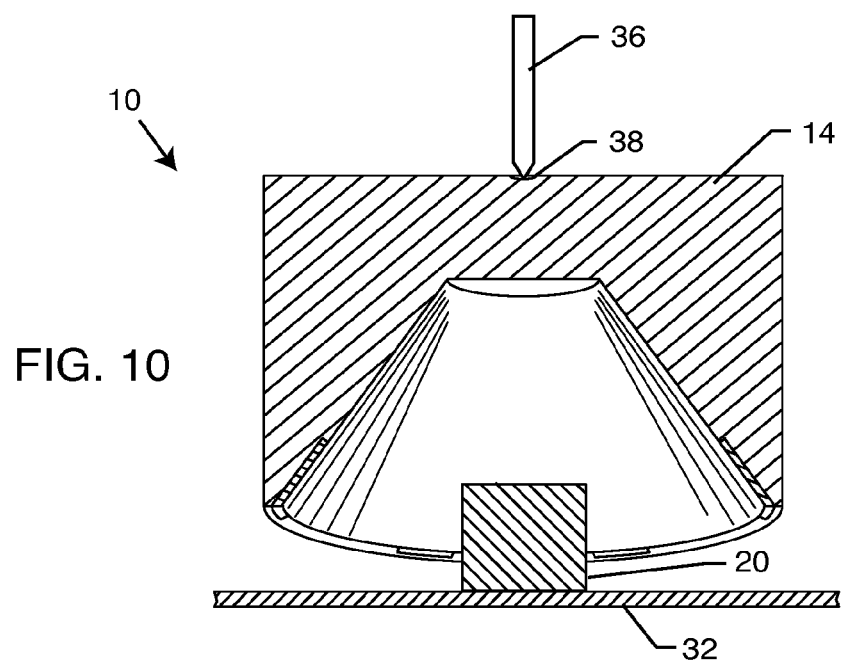
FIG. 10 is a cross-sectional view taken along the line 10-10 of FIG. 9.

The permanent magnetic male and female levitation support system 10 is shown in another alternative embodiment in FIGS. 9-10. The female part 14 is levitated relative to the male part 20 as rigidly connected to a base 32. As previously disclosed, the permanent magnetic male and female levitation support 10 maintains alignment of the concentric axis of the female part 14 with the concentric axis of the male part 20. Thus, the female part 14 is free to rotate against a pin 36 at a point 38. In this configuration, the friction between the male part 20 and the female part 14 is mitigated as the two parts do not contact one another. Any vertical movement of the male part 20 toward the base of the conical cavity 18 is immediately repulsed by the magnetic field of the female part 14. In high force applications non-friction rotation reduces the wear of the rotating part (i.e., the female part 14) and the corresponding male part 20. Hence, the present invention promotes longer life, stability, functionality, and durability of the rotating parts by eliminating the frictional contact between the female part 14 and the male part 20.

In another embodiment, the present invention enables movement along a rail defining a plane (not shown). For example, the female part 14 is levitated with respect to the male part 20 similar to FIGS. 9-10. In this embodiment, the magnetic forces of the female part 14 and the male part 20 align along a rotationally invariant plane of symmetry. The female part 14 supports a structure, such as the base of a train, for movement along the rail. The male part 20 facilitates levitated relative movement as being placed at equal intervals along the base of the rail. There is no contact between the female part 14, and the male part 20. Hence, the base of the train is free to transversely along the rail without friction. The need for bearings, wheels, and lubrication is eliminated. Uses for such an embodiment include the home, roller coasters, trains, drawers, and other devices of the same type.

Accordingly, a main advantage of the present invention is that when placed in close proximity, the female part 14 and the male part 20 exert forces on one another. These forces maintain the female part 14 and the male part 20 in a specific relative configuration along a common axis or plane. Hence, the female part 14 and the male part 20 neither contact one another nor tend to change relative orientation. This resultant effect occurs without the direct physical contact of the female part 14 with the male part 20.

The advantage of maintaining the relative orientation and distance without the direct physical contact of the female part 14 and the male part 20 has several derivative advantages. First, absent direct physical contact, motion by either the female part 14 or the male part 20 does not produce sliding, rubbing, tapping, or any other contact-related effect. Loss of energy due to friction, degradation of materials due to rubbing or tapping, fretting, chipping, or other physical decay of any of the parts, and aging due to thermal breakdown does not occur. Moreover, no cooling elements are needed to radiate evolved heat generated by friction or moving parts. Maintenance of the junction, the use of lubrication, and a sealing of lubricant is also not required.

A second derivative advantage of maintaining relative orientation and distance without direct physical contact of the female part 14 with the male part 20 is that tracks, rollers, bearings, or motion guards are not required. Moreover, fewer devices simplify the overall design of the subsequent or derivative technology. Lubricants are not needed for roller or bearing movement. Seals are not required to retain lubricants within the tracks, rails, or enclosures. No reinforcement is required to handle high torque motions. Technologies incorporating the present invention are therefore lightweight and less expensive to produce than technologies incorporating the aforementioned additional supports.

Another advantage of the present invention is that thermal transfer between the female part 14 and the male part 20 is limited. Since there is no direct physical contact between the female part 14 and the male part 20, heat generated in the female part 14 is not transferred directly via physical contact with the male part 20. In vacuum evacuation, the permanent magnetic male and female levitation support 10 is in thermal isolation. This allows the evolution and maintenance of the thermal gradient in a chamber.

In another aspect of the present invention, high frequency light vibrations between the female part 14 and the male part 20 is reduced. This allows the permanent magnetic male and female levitation support 10 to be used in a number of different applications that require limited vibrational movement. Such applications might include: supports for tables, machinery, etc. The present invention works particularly well with devices that require precise measurements or movements that are otherwise affected by high frequency vibrations.

Furthermore, special materials required for construction of various machines are not required. High strength parts made of durable materials capable of withstanding long term wear are no longer required because the female part 14 and the male part 20 do not contact one another. Eliminating contact between the female part 14 and the male part 20 removes the need for extremely robust materials. As a result, the strength of the machinery materials need not account for friction or wear. Hence, stronger and more durable materials that withstand wear are no longer needed. Manufacturers save any costs associated with such materials.

Additionally, the present invention does not require power in any of the disclosed designs. Derivative technologies incorporating the present invention also will not require power to levitate, lubricate, pump fluid, or perform any other aspect of levitation or stabilization of the present invention. Derivative technologies therefore will be lighter, cheaper, and contain fewer parts and materials than otherwise identically functioning technologies.

In another embodiment, relative stabilization of the female part 14 to the male part 20 requires only the single contact point 38. The contact point 38 may be extremely small. Friction of the movable parts of the permanent magnetic male and female levitation support 10 is a fraction of other similar technologies. Additionally, friction decreases, as opposed to increases, by increasing the load exerted on the female part 14 and the male part 20. The friction relative to the overall force is exceedingly small. Devices that require exceedingly precise measurements or whose energy input might otherwise be overwhelmed by friction are particularly preferred as integrated with the present invention. Applicable fields of use include energy, olfaction, precise measurement among other fields.

Although several embodiments have been described in detail for purposes of illustration, various modifications may be made without departing from the scope and spirit of the invention. Accordingly, the invention is not to be limited, except as by the appended claims.

What is claimed is:

1. A permanent magnetic levitation support, comprising:
a first part having a cavity and a first axis extending through the center of the cavity;
a plurality of first permanent magnets distributed about a perimeter of the cavity, wherein the permanent magnets are co-aligned about the perimeter of the cavity such that each of the first permanent magnets have a magnetic pole extending substantially perpendicular to a wall in the cavity to produce a first rotationally invariant magnetic field around a node aligned with the first axis; and
a second part comprising at least one second permanent magnet rigidly connected to a base, the second part producing a second rotationally invariant magnetic field around a second axis, wherein the first permanent magnets produce the first magnetic field that is symmetric about a first plane corresponding to the first axis, and the second part produces the second magnetic field that is symmetric about a second plane corresponding to the second axis, wherein when the first plane is aligned with the second plane along a transverse plane, the first magnetic field and the second magnetic field simultaneously producing a repulsive force and a restorative force to permit movement of the first part along the transverse plane as levitated relative to the second part;

wherein when the first axis is at least partially aligned with the second axis, and the first magnetic field and the second magnetic field simultaneously produce the repulsive force and the restorative force to levitate the first part relative to the second part, the first part is rotatable about a pivot pin positioned opposite the second part and aligned with the first axis.

2. The levitation support of claim 1, wherein the first permanent magnets are disposed at least partially within a plurality of grooves formed in the cavity.

3. The levitation support of claim 2, wherein the first permanent magnets are at least partially affixed within the grooves by friction, glue, or mechanical restriction.

4. The levitation support of claim 1, wherein the cavity has a frusto-conical shape.

5. The levitation support of claim 4, wherein the first magnetic field and the second magnetic field simultaneously produce the repulsive force and the restorative force to levitate the first part relative to the second part when an angle between the first axis and the second axis does not exceed a defining angle $\theta_c$ of the frusto-conical cavity.

6. A permanent magnetic levitation support, comprising:
a first part having a cavity and a first axis extending through the center of the cavity;
a plurality of first permanent magnets distributed about a perimeter of the cavity, wherein the permanent magnets are co-aligned about the perimeter of the cavity such that each of the first permanent magnets have a magnetic pole extending substantially perpendicular to a wall in the cavity to produce a first rotationally invariant magnetic field around a node aligned with the first axis; and
a second part comprising at least one second permanent magnet rigidly connected to a base, the second part producing a second rotationally invariant magnetic field around a second axis, wherein the first permanent magnets produce the first magnetic field that may be symmetric about a first plane corresponding to the first axis, and the second part produces the second magnetic field that may be symmetric about a second plane corresponding to the second axis, wherein when the first magnetic field is symmetric about the first axis and the first axis is at least partially aligned with the second axis, the first magnetic field and the second magnetic field simultaneously produce a repulsive force and a restorative force;

wherein when the first axis is at least partially aligned with the second axis, and the first magnetic field and the second magnetic field simultaneously produce the repulsive force and the restorative force to levitate the first part relative to the second part, the first part is rotatable about a pivot pin positioned opposite the second part and aligned with the first axis.

7. The levitation support of claim 6, wherein the first permanent magnets are disposed at least partially within a plurality of grooves formed in the cavity.

8. The levitation support of claim 7, wherein the first permanent magnets are at least partially affixed within the grooves by friction, glue, or mechanical restriction.

9. The levitation support of claim 6, wherein the cavity has a frusto-conical shape.

10. The levitation support of claim 9, wherein the first magnetic field and the second magnetic field simultaneously produce the repulsive force and the restorative force to levitate the first part relative to the second part when an angle between the first axis and the second axis does not exceed a defining angle $\theta_c$ of the frusto-conical cavity.

* * * * *